United States Patent Office 2,914,391
Patented Nov. 24, 1959

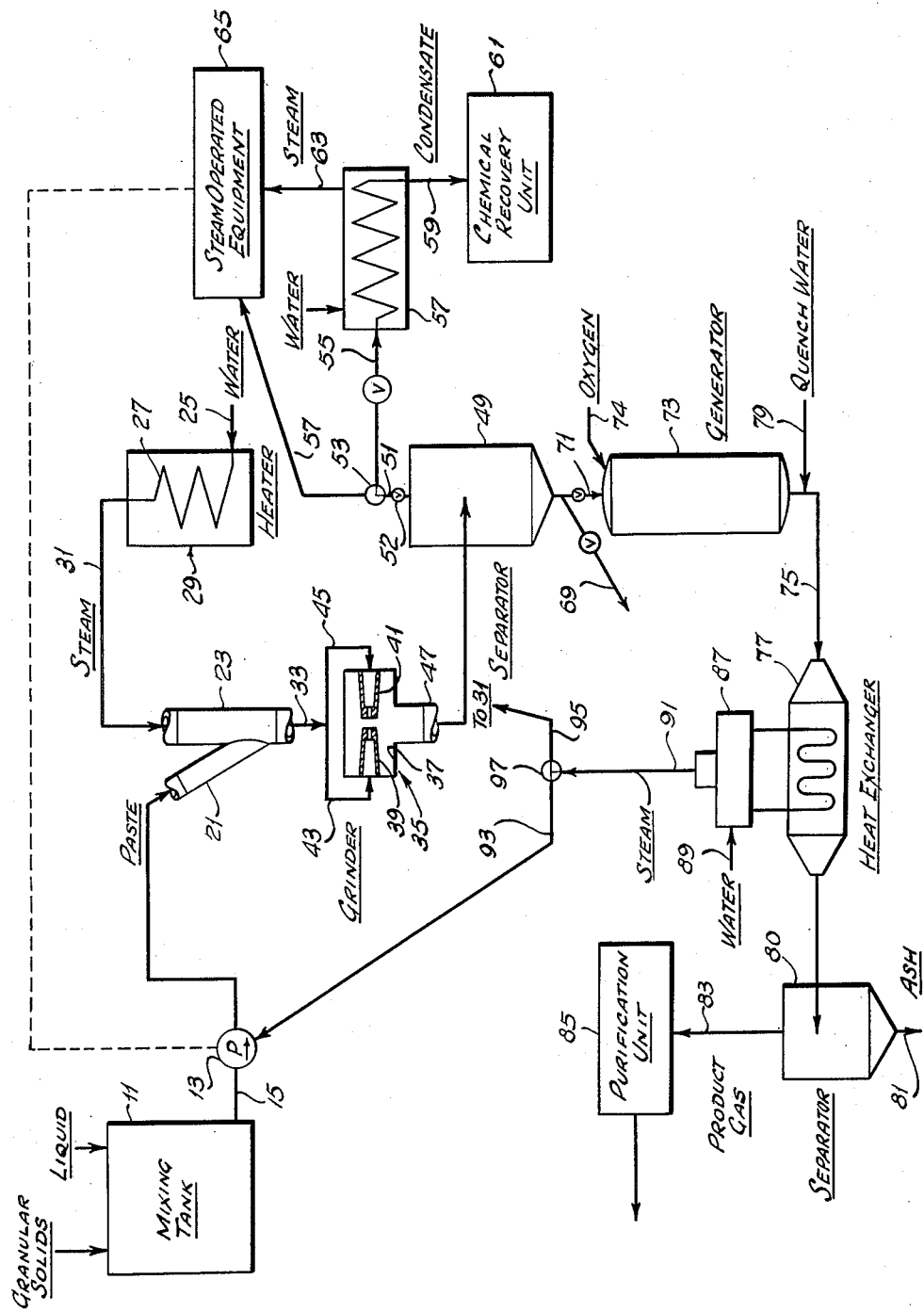

2,914,391

TREATING SOLID MATERIALS

William M. Stratford, New York, N.Y., assignor to Texaco Inc., a corporation of Delaware Application March 4, 1955, Serial No. 492,077

8 Claims. (Cl. 48—206)

The present invention relates to novel improvements in procedures for treating granular particles of solid materials. It is especially applicable to such procedures which include the step of forming a flowing dispersion of solid particles in a vapor.

Examples of the types of procedures to which the present improvement may be applied are fluid energy grinding, gasification of carbonaceous solid materials, and distillation of volatile chemicals from solids containing them (e.g. bituminous coal, lignite, or wood).

In its broader aspects my invention is a method for treating particles of a solid material comprising first forming a flowable paste of the particles in a liquid, and then passing the paste along in a confined flowing stream. Meanwhile, there is separately and independently generated a large quantity of hot vapor which is passed as a high velocity flowing stream into conjunction with the stream of paste to combine with the latter and vaporize a substantial part or all of its liquid content, thereby forming a flowing dispersion of solid particles associated with vapor.

Liquid in the amount of 5–35% by weight is generally used to make up a paste which can be passed along by extrusion mechanically, or by gas pressure.

By forming a dispersion of solid particles in vapor in this manner, the deposition of solids on walls of conduits of the system is avoided and clogging of the conduits thus is prevented. Such undesirable disposition occurs sometimes when a vaporous dispersion is formed solely by evaporation of the liquid content of a slurry by heating it during its passage through a long heated tube, especially in the transition zone between all liquid and all vapor phases, whereas there is no such action in my improved procedure because extraneous heat is not applied. With many solids which do not contain solubles, such deposition will occur mainly at the vapor end of the transition zone; and with others, such as coal containing solubles, deposition may occur also at some intermediate point where the liquid is supersaturated with soluble materials leached out of the charged solid particles, whereas such leaching is avoided by my procedure.

Also, erosion will be reduced by my method.

Another advantage is that solids are subjected to very high temperatures for only relatively short minimum periods of time, thus lessening any detrimental effects from high temperatures, e.g. the cracking of volatiles distilled from coal.

My novel method steps can be applied successfully to the grinding of many different kinds of solid particles by passing the vaporous dispersion to a fluid energy grinder of any desired type, wherein the particles are caused to impinge against one another and disintegrate. For example, solids may be thus ground for use as thickening agents, rubber extenders, etc.

With or without such a grinding step interposed, the described method steps are useful as a preliminary to the treating of carbonaceous materials by controlled partial combustion to produce carbon monoxide and hydrogen as effluent gases. At the same time, if desired, volatile materials which have been driven from the carbonaceous material can be recovered by separating the vapor and accompanying volatiles from the carbonaceous particles, and then subjecting the volatiles to a chemical recovery process. Energy can also be recovered from the hot separated vapors, if desired.

Water will be described below as exemplary of liquids for pasting the solid particles, but it is evident that my novel method can also be carried out with other liquids, either alone or mixed with one another or with water, for example liquid hydrocarbons (e.g. kerosene, mineral oil, liquified propane, liquified butane), coal tar distillates, alcohol, glycols, diphenyl, carbon tetrachloride and the like. Also, while the liquid from which vapor is separately generated ordinarily is the same as the pasting liquid, different liquids also may be used.

It also should be pointed out that while bituminous coal and talc will be mentioned below to exemplify the invention, many different solid materials can be treated by the same procedure. Among such materials are anthracite and lignite coals, limestone, gypsum, chalk, clay, marble, barite, aluminum, magnesium, wood and oyster shells.

The principles of the invention will be readily apparent from the following detailed description, having reference to the single figure of the drawing which is a schematic flow sheet showing a novel arrangement of apparatus for performing my novel method.

Referring to the drawing, there is first formed in a mixing tank 11 a pasty mixture of crushed coal particles in water. The coal particles may be quite coarse in size having an average diameter of around $\frac{1}{16}$ inch more or less. The portion of liquid to solid particles may vary over a wide range as long as the pasty mixture retains flowability.

Paste from tank 11 is passed by an extrusion pump 13 through a conduit 15 into a branch pipe 21 of a mixing device 23 wherein the mixture is picked up by a high velocity, high pressure stream of steam. As a result of pressure reduction and steam introduction the liquid content of the mixture is rapidly vaporized to form a flowing dispersion of the solid particles associated with steam.

The stream of steam is generated and supplied to mixer 23 by passing water from a line 25 into a coiled evaporator pipe 27 in a heater 29 which may be fired by an oil or gas flame or the like. Steam then leaves the evaporator through a discharge conduit 31 and enters the mixer 23 to pick up the paste, as described above.

In the particular embodiment being described to exemplify the principles of the invention, the dispersion of relatively coarse coal particles in steam from the mixer 23 then passes through a short conduit 33 to a fluid energy grinder 35. One type of grinder suitable for this invention comprises an enlarged relatively low pressure chamber 37 containing a pair of axially aligned 180° opposed nozzles 39 and 41 which are connected to conduit 33 by separate ducts 43 and 45 respectively. Another suitable grinder employs a convergent-divergent nozzle in the line for greatly increasing the velocity and turbulence of the dispersion.

The dispersion has been flowing at a relatively low velocity, such as in the neighborhood of 25–100 feet per second as it passes through conduit 33 and ducts 43 and 45. Nozzles 39 and 41 have orifices of diameters much less than the diameter of conduit 33 and, as the pressure in chamber 37 is much lower than upstream, the dispersion flows through the nozzles at a greatly increased velocity of the order of from 100 feet per second to several thousand feet per second. The jets of dispersion thus impinge against one another turbulently at extremely high relative velocities, and the particles of coal are so greatly reduced in size that the major portion is only a few microns in diameter.

From grinder 35 the dispersion of disintegrated particles in steam flows at relatively low velocity through a discharge conduit 47 of much larger diameter than conduit 33 to a suitable separator 49 such as a centrifugal separator of the cyclone type. In separator 49 part or all of the steam and other volatile material is taken off the top through a conduit 51 controlled by an adjustable throttle valve 52, and by a three-way valve 53 at the junction of a pair of conduits 55 and 57.

When the solid material is one such as coal containing volatile vaporizable chemical constituents, their recovery is desirable for economy. Thus valve 53 is turned so that the effluent from separator 49 flows through a conduit 55 to a heat exchange device 57 wherein the heat of the steam and accompanying volatiles is exchanged indirectly with incoming water to vaporize the latter. The cooled volatiles and accompanying steam or condensed water pass through an outlet 59 into a recovery unit 61 wherein the volatile materials can be treated and recovered in any conventional manner. Meanwhile, the steam generated in exchange 57 passes through a conduit 63 to a device 65 which utilizes the energy of the steam, e.g. an electrical generator, a steam actuated pump, or an air compressor. Device 65 may operate pump 13 for forcing the pasty mixture through pipe 15 to mixer 23.

When the solid material which has been treated in the system described above is one not containing recoverable volatiles, for example talc or clay, steam leaving the top of separator 49 can be utilized directly for operating the equipment 65 by turning the valve 53 to connect conduit 51 with a conduit 57.

The fine solid particles of coal drop to the bottom of separator 49 and are taken off through a conduit 71 feeding a gas generator 73 wherein they are burned with oxygen supplied through a line 74 to form carbon monoxide and hydrogen, together with ash.

Product gases from generator 73 are discharged through a line 75 into a heat exchanger 77. Water may be supplied to line 75 through a line 79 to quench the product gas. The residual solid particles comprising mostly ash are separated from the gas stream in a separator 80, the ash is discharged through a line 81, and product gases are disposed of by way of conduit 83 leading to a purification unit 85. Of course, when generator 73 is hot enough to melt the ash, which is then discharged as a molten slag, separator 80 is unnecessary.

The heat exchanger 77 is in the form of a waste heat boiler with feed water supplied through a line 89. Steam generated by the waste heat boiler is discharged through a line 91 to any suitable equipment for utilizing its energy. One advantageous procedure is to pass steam from line 91 to one or both of conduits 93 and 95 for operating pump 13 and for mixer 23. A three way valve 97 controls these conduits.

When feeding the coal particles into the generator 73 it is usually desirable to accompany them with sufficient of the steam forming the dispersion in conduit 47, to assure proper control of the reaction temperature. The amount of such steam kept with the solid particles is controlled by valve 52 in the conduit 51 leading from the top of separator 49.

Alternatively, if gas generation is not desired, or if the solid is a non-combustible one such as talc, the fine particles are removed from separator 49 through a conduit 69 independent of the gas generating system.

*Example I*

A paste containing 70% by weight of Utah bituminous coal (74 microns average particle size) and 30% by weight of water is made up in tank 11 and pumped at a rate of 1000 pounds per hour to the mixing device 23 wherein it meets a stream of steam at 700 p.s.i.a. and 900° F. flowing from pipe 31 at a rate of 3830 pounds per hour.

Heat from the steam vaporizes the water from the paste and there is formed a dispersion of coal particles in steam which flows from mixing device 23 to grinder 35. At the inlets to nozzles 39 and 41 the pressure and temperature of the dispersion are 500 p.s.i.a. and 650° F., respectively.

Nozzles 39 and 41 have inside diameters of 5/32 inch and are spaced apart 5/8 inch at their outlets. Conduits 43 and 45 have inside diameters of 3/4 inch. Pipe 47 has an inside diameter of 4 inches.

After leaving grinder 35, 90% of the steam is separated from the dispersion in cyclone 49 as a source of energy for the equipment 65. The remainder of the steam flows with the ground coal particles (now having an average size of 5 microns) into a synthesis gas generator 73 which is held at a temperature of 2650° F. and a pressure of 350 p.s.i.a., wherein the reaction with oxygen proceeds in a well known manner.

*Example II*

A pasty mixture containing 90% by weight of talc (74 microns average particle size), balance water, is made up in tank 11 and passed through pipe 15 at a linear velocity of 5 feet per second and a rate of 1000 pounds per hour.

The paste then enters mixing device 23 wherein it meets a stream of steam at 900° F. and 700 p.s.i.a, flowing at a rate of 4050 pounds per hour.

A dispersion of talc particles in steam thus is formed which flows to a grinder 35 sized as in Example I. At the inlets to nozzles 39 and 41 the pressure is 400 p.s.i.a. and the temperature 750° F. When the opposed jets from the nozzles impinge against one another the talc is reduced to an average particle size of 5 microns.

The ground talc and steam enter cyclone 49 for the separation of steam from talc. Steam passes off the top through lines 51 and 57 to the steam operated device 65. Talc is removed at the bottom through outlet conduit 69.

Obviously, many modifications and variations of the invention, as hereinbefore set forth, may be made without departing from the spirit and scope thereof, and therefore only such limitations should be imposed as are indicated in the appended claims.

I claim:

1. In a process which comprises forming a flowable mixture of relatively coarse particles of a solid disintegratable material in a vaporizable liquid, flowing said mixture into and through a tubular heating zone, heating said mixture during passage through said tubular zone to a temperature above the boiling point of the liquid component of said mixture, vaporizing substantially all of said liquid component during passage through said tubular zone, forming therein a dispersion of solid particles in resulting vapor, passing said dispersion through a succeeding zone of high velocity flow, subjecting the flowing stream therein to turbulence and a velocity of the order of at least 25 feet per second thereby effecting disintegration of said coarse particles, and discharging from said high velocity zone said stream containing finely ground solids suspended therein, the improvement which comprises: forming said flowable mixture as a pasty mixture containing not more than 35% of said vaporizable liquid by weight, and heating said pasty mixture during passage through said tubular zone by separately generating hot vapor and passing said hot vapor as a stream into conjunction with said stream of pasty mixture to combine with said latter stream and vaporize liquid content thereof, thereby preventing the deposition of solids on the walls of said tubular zone.

2. A method in accordance with claim 1 wherein said liquid and vapor are water and steam, respectively.

3. A method in accordance with claim 1 wherein said dispersion is passed through said succeeding zone of high velocity flow as a plurality of opposed mutually impinging jets of dispersion.

4. A method in accordance with claim 1 wherein said solid material is carbonaceous in nature, said method also comprising feeding disintegrated solid particles into a combustion zone downstream of said zone of high velocity flow, and gasifying said particles by partial combustion in said combustion zone to form carbon monoxide and hydrogen.

5. A method in accordance with claim 4, also comprising separating vapor from said disintegrated particles between the steps of disintegrating and gasifying said particles.

6. A method in accordance with claim 1 wherein said pasty mixture contains between 5 and 35 percent by weight of said liquid.

7. A method for treating particles of a solid carbonaceous material comprising forming a pasty mixture of said particles in water, said water comprising not more than 35% of said mixture by weight; forcing said pasty mixture as a confined stream through a tubular zone; separately generating steam; passing said steam as a stream into conjunction with said stream of pasty mixture, said steam containing sufficient heat to combine with said latter stream and vaporize water content thereof, thereby forming a flowing dispersion of said particles dispersed in steam and preventing the deposition of solids on the walls of said tubular zone; thereafter feeding said particles into a combustion zone and burning said solid particles; using the heat of combustion of said solid particles to vaporize water to steam; and passing the steam so generated into conjunction with said stream of pasty mixture as at least part of the total required steam.

8. A method for treating particles of a solid carbonaceous material comprising forming a pasty mixture of said particles in a vaporizable liquid, said liquid comprising not more than 35% of said mixture by weight; passing said pasty mixture as a confined stream through a tubular zone; separately generating hot vapor; passing said hot vapor as a stream into conjunction with said stream of pasty mixture, said hot vapor containing sufficient heat to combine with said latter stream and vaporize liquid content thereof, thereby forming a flowing dispersion of said particles dispersed in vapor and preventing the deposition of solids on the walls of said tubular zone; feeding said particles into a combustion zone; and thereafter gasifying said solid particles by partial combustion in said combustion zone to form carbon monoxide and hydrogen.

References Cited in the file of this patent

UNITED STATES PATENTS

| | | |
|---|---|---|
| 2,494,153 | Andrews | Jan. 10, 1950 |
| 2,515,542 | Yellott | July 18, 1950 |
| 2,560,807 | Lobo | July 17, 1951 |
| 2,656,308 | Pettyjohn | Oct. 20, 1953 |
| 2,669,509 | Sellers | Feb. 16, 1954 |
| 2,672,296 | Venable | Mar. 16, 1954 |
| 2,712,495 | Clarke | July 5, 1955 |
| 2,763,434 | Strausser | Sept. 18, 1956 |

FOREIGN PATENTS

| | | |
|---|---|---|
| 459,044 | Italy | Aug. 23, 1950 |